(12) United States Patent
Lefebvre et al.

(10) Patent No.: US 10,371,293 B2
(45) Date of Patent: Aug. 6, 2019

(54) MOVEMENT-CONSTRAINING ASSEMBLY FOR FLUID-CONVEYING SYSTEM

(71) Applicant: Pratt & Whitney Canada Corp., Longueuil (CA)

(72) Inventors: Guy Lefebvre, Saint-Bruno-de-Montarville (CA); John Pietrobon, Outremont (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1228 days.

(21) Appl. No.: 14/306,729

(22) Filed: Jun. 17, 2014

(65) Prior Publication Data

US 2015/0362108 A1 Dec. 17, 2015

(51) Int. Cl.
*F16L 19/00* (2006.01)
*F16L 15/08* (2006.01)

(52) U.S. Cl.
CPC ............. *F16L 19/005* (2013.01); *F16L 15/08* (2013.01); *F16L 2201/20* (2013.01)

(58) Field of Classification Search
CPC ...... F16L 19/005; F16L 15/08; F16L 2201/20
See application file for complete search history.

(56) References Cited

U.S. PATENT DOCUMENTS

| | | | | |
|---|---|---|---|---|
| 3,462,727 A | * | 8/1969 | Damoisiaux | H01R 13/621 285/89 |
| 4,111,514 A | * | 9/1978 | Brishka | H01R 13/64 285/914 |
| 4,211,439 A | * | 7/1980 | Moldestad | F16L 37/113 285/27 |
| 4,655,482 A | * | 4/1987 | Myers | F16L 19/005 285/305 |
| 5,186,501 A | | 2/1993 | Mano | |
| 5,215,336 A | * | 6/1993 | Worthing | F16L 19/005 285/319 |
| 5,348,349 A | | 9/1994 | Sloane | |
| 5,362,111 A | * | 11/1994 | Harbin | F16L 19/005 285/330 |
| 5,851,035 A | * | 12/1998 | Marc | F16L 19/005 285/86 |

(Continued)

FOREIGN PATENT DOCUMENTS

WO 2006/108724 A1 10/2006

*Primary Examiner* — James M Hewitt, II
(74) *Attorney, Agent, or Firm* — Norton Rose Fulbright Canada LLP (57) ABSTRACT

A movement-constraining assembly for a fluid-conveying system comprises a tubular body adapted to be secured to a component coupling end of a component of the fluid-conveying system. A fluid-conveying tube has a tube coupling end adapted to be connected to the component of the fluid-conveying system and defining an inner passage for fluid to pass therethrough to or from the component, the tube having an interface at the tube coupling end. A blocking nut has an inner surface complementary to at least a surface of the interface of the tube to block rotation between the tube and the blocking nut, the blocking nut further comprising an outer surface complementary to a surface of the tubular body to block rotation between the blocking nut and the component, whereby the blocking nut blocks a rotation between the fluid-conveying tube and the component coupling end.

20 Claims, 8 Drawing Sheets

(56) References Cited

U.S. PATENT DOCUMENTS

| | | | |
|---|---|---|---|
| 5,882,044 A | | 3/1999 | Sloane |
| 6,077,010 A | * | 6/2000 | Reid .................... F16B 5/0208 411/107 |
| 6,439,616 B1 | | 8/2002 | Karafillis et al. |
| 8,215,884 B2 | | 7/2012 | Bulow |
| 8,656,575 B1 | | 2/2014 | Bulow |
| 2007/0256404 A1 | * | 11/2007 | Lefebvre ................ F01D 21/06 60/39.091 |
| 2014/0265317 A1 | * | 9/2014 | Pearl, II ............. F16L 27/0816 285/317 |
| 2015/0240976 A1 | * | 8/2015 | Lefebvre ................ F16L 25/06 285/81 |

* cited by examiner

MOVEMENT-CONSTRAINING ASSEMBLY FOR FLUID-CONVEYING SYSTEM

TECHNICAL FIELD

The present disclosure relates to fluid-conveying systems and to movement-constraining assemblies therefor.

BACKGROUND OF THE ART

Tubes (a.k.a. tubing, piping, pipes, etc) are conventionally used in hydraulic or pneumatic circuits or similar applications to convey fluids between components. Depending on the applications, tubes may be subjected to rattling, vibrations, thermal variations, whereby tubes move relative to surrounding structures. One known application in which tubes may move is in aircraft. As an example, tubes may be coupled to one another or to components by threading engagement. If the tubes become unscrewed because of vibrations, rotations, etc, fluid leaks may result.

SUMMARY

In accordance with an embodiment of the present disclosure, there is provided a movement-constraining assembly for a fluid-conveying system, comprising: a fluid-conveying tube defining an inner passage for fluid to pass therethrough, the tube adapted to be connected to components of the fluid-conveying system at opposed ends thereof; a blocking ring mounted to the tube with complementary surfaces between the tube and the blocking ring to block rotation between the tube and the blocking ring, the blocking ring having a first joint portion; and a base adapted to be secured to a structure, and having a second joint portion operatively joined to the first joint portion of the blocking ring to form a joint blocking at least an axial rotational degree of freedom of the fluid-conveying tube and allowing at least one translational degree of freedom of the tube relative to the structure.

In accordance with another embodiment, there is provided a method for constraining movement of a fluid-conveying tube of a fluid conveying-system comprising: connecting the fluid-conveying tube at a first end to a component of a fluid-conveying system; securing a base having a joint portion to a structure adjacent to the fluid-conveying tube as connected to said component; installing a blocking ring on the fluid-conveying tube by engaging complementary surfaces therebetween to block rotation between the tube and the blocking ring, the blocking ring have a joint portion; and operatively joining the joint portions of the base and of the blocking ring to form a blocking at least an axial rotational degree of freedom of the fluid-conveying tube and allowing at least one translational degree of freedom of the tube relative to the structure.

DETAILED DESCRIPTION

Figure 1:
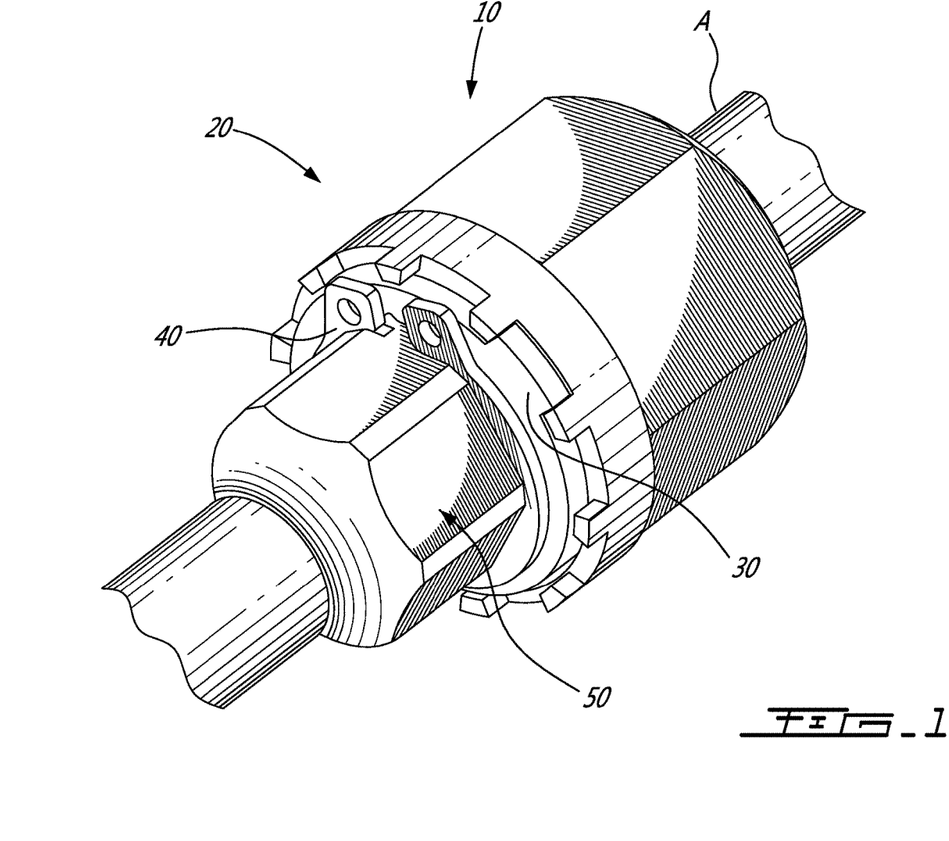
FIG. 1 is an enlarged perspective view of a movement-constraining assembly for fluid-conveying system in accordance with the present disclosure, at the junction between tubes.
Figure 2:
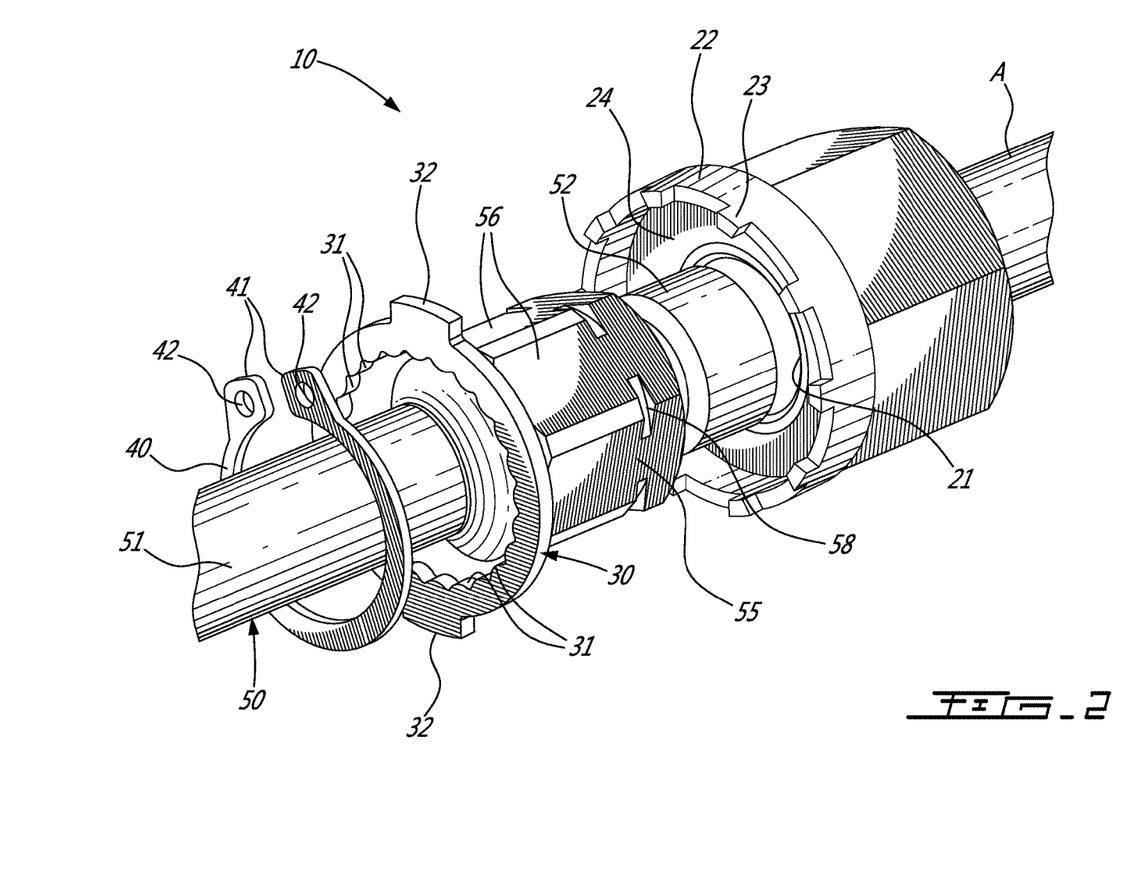
FIG. 2 is an assembly view of the assembly of FIG. 1.

Referring to the drawings and more particularly to FIGS. 1 and 2, a movement-constraining assembly for tubes (i.e., tube couplings) of a fluid-conveying system is generally shown at 10. The movement-constraining assembly 10 comprises a tubular body 20, a blocking nut 30, a retaining ring 40 and a tube 50, which tube 50 is constrained from moving by the assembly 10.

The tubular body 20 is mounted to a coupling end of a tube A or a structure B or conduit of a component (FIG. 8) that has a nipple or like tube end. The tubular body 20 may be integral with the tube A or the structure B and rotates therewith.

The blocking nut 30 is coupled to the tube 50 and will cooperate with the tubular body 20 to form a joint constraining movement of the tube 50, for instance by forming an anti-rotation feature.

The retaining ring 40 may be part of the assembly 10 and is one contemplated solution to hold the blocking nut 30 captive in engagement with the tubular body 20.

The tubes A and 50 and the structure B (FIG. 8) are connected at opposed ends to components of a fluid-conveying system, such as other tubes or pipes of a hydraulic circuit, or equipment e.g., tank, injection system, etc. The tubes A and 50 and the structure B may also be part of the fluid-conveying system as their inner passages serve for conveying fluids.

Referring to FIGS. 1 and 2, the tubular body 20 is shown in greater detail. The tubular body 20 may be part of the tube A or may be separate therefrom and added on. The tubular body 20 is thus at a coupling or connector end of the tube A, and is mounted peripherally to the tube A such that an inner passage of the tube A is unobstructed for fluid flow therethrough to and/or from the tube 50. In an embodiment, the tube A is an oil tube that is part of a hydraulic system. Tapping 21 is provided inside the inner passage, for the tube 50 to be screwingly engaged to the tube A. Although the embodiment of FIGS. 1 and 2 shows tapping 21, a threaded end could be provided instead of the tapping 21. Likewise, other connector configurations could be used as well, such as quick coupling, barb, etc, in any appropriate combination.

Figure 3:
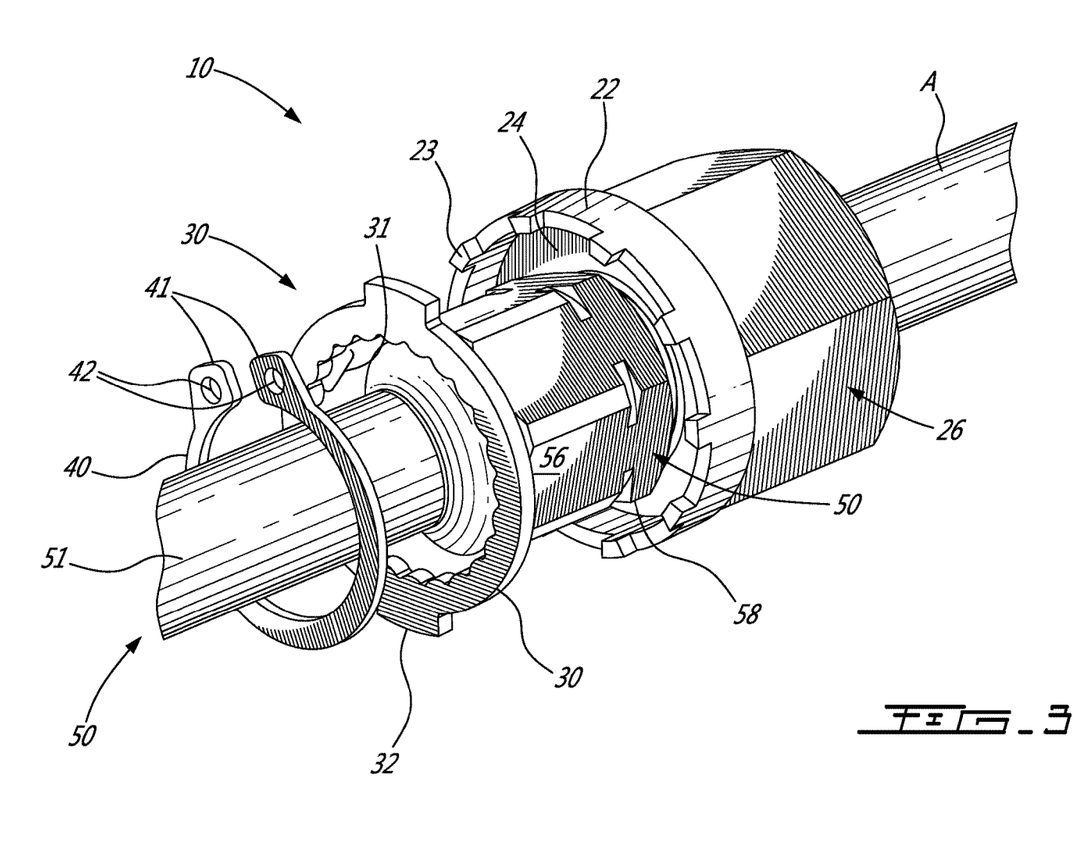
FIG. 3 is an assembly view of the assembly of FIG. 1, with a blocking nut being slid into engagement on an interface of a tube.

Still referring to FIG. 3, the tubular body 20 has an annular projection 22 extending in an axial direction away from the tube A. A crenellation pattern 23 is defined at the periphery of the annular projection 22 and will collaborate with the blocking nut 30 in preventing rotation between tube A and tube 50, in a manner detailed hereinafter, i.e., defining a crenellated rim. The crenellation pattern 23 is one of numerous contemplated abutment shapes that can be provided in the tubular body 20 to block movements. The annular projection 22 may further define a countersink 24 that will receive an end of the tube 50 therein.

The tubular body 20 has a generally cylindrical configuration, although it is not circular peripherally, but rather has a plurality of outer flats 26, so as to form a nut head, such a hexagonal head or the like, for being manipulated by tools (e.g., wrenches, sockets, etc. The tubular body 20 may have multiple other configurations, such as knurling, etc, to provide contact surfaces when manipulated by tools.

Figure 4:
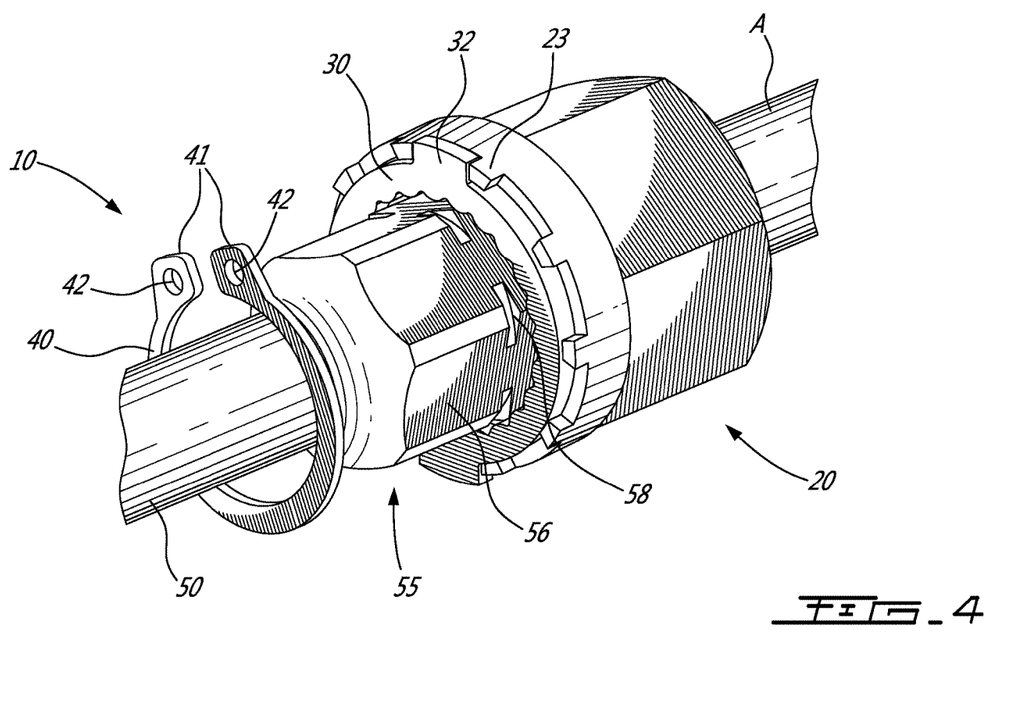
FIG. 4 is an assembly view of the assembly of FIG. 1, with a retaining ring prior to engagement on the interface of the tube.
Figure 5:
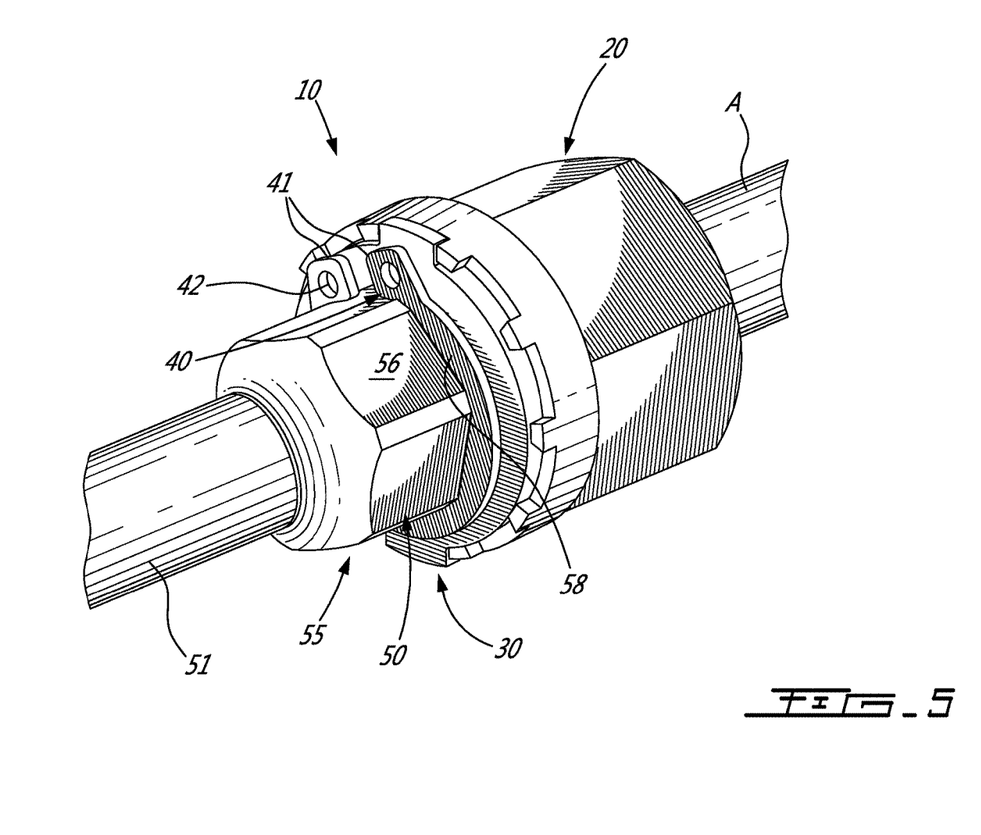
FIG. 5 is an assembly view of the assembly of FIG. 1, with the retaining ring engaged to the interface of the tube.
Figure 7:
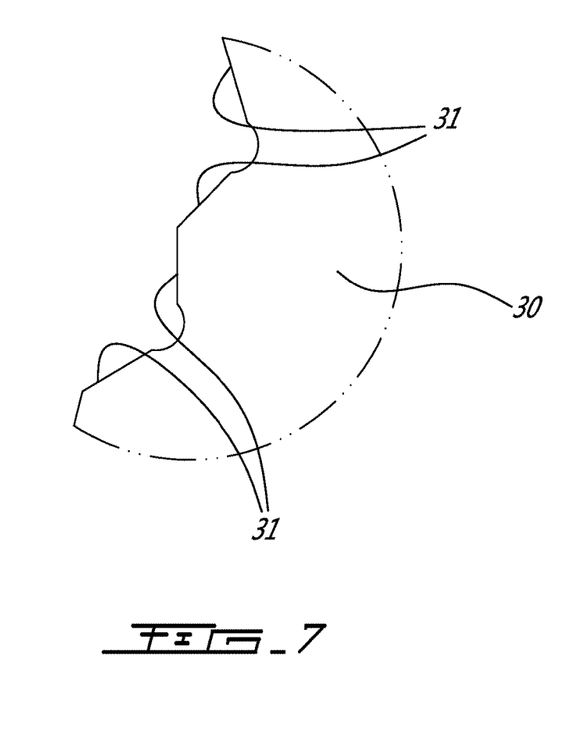
FIG. 7 is an enlarged view showing troughs between inner flats in the blocking ring of FIG. 3.

Referring to FIGS. 2, 3 and 4, the blocking nut 30 is shown in greater detail and may also be called a locking plate, locking member, blocking ring, etc. The blocking ring 30 has a plurality of inner flats 31. The inner flats 31 are paired to define axial channels (i.e., troughs), which axial channels are compatible in terms of dimensions with the shape the tube 50, as described hereinafter. FIG. 7 shows exemplary dimensions for the inner flats 31. A round clearance may be provided at the intersection between inner flats 31, so as to give space to edges of the hexagonal interface 55, for instance when tight tolerances are used. Accordingly, in the manner shown in FIGS. 2-4, the blocking nut 30 may be slid onto the tube 50, with sliding engagement between the inner surface of the blocking ring 30 and the tube 50, in such a way that the blocking ring 30 is prevented from rotating about the tube 50.

The blocking nut 30 is shown having a pair of lugs 32 on its outer surface. The lugs 32 project radially outwardly in the blocking nut 30. This is one of the numerous configurations considered—for instance regular convex polygons are well suited sectional shapes for the outer surface of the blocking nut 30. In the illustrated embodiments, the lugs 32 are integral with the annular body of the blocking nut 30, and concurrently form a substantially flat monolithic piece that can punched, cast, etc. For instance, the nut 30 may be fabricated from a sheet metal plate. Although a pair of the lugs 32 is shown, the blocking nut 30 may have a single one of the lugs 32, or more than a pair. The lugs 32 are clocked with the troughs of the inner flats 31.

The blocking nut 30 has a height 33. The height 33 generally corresponds to the space between the depressions in the crenellations 23 and the retaining ring 40, when the assembly 10 is as in FIG. 1. Accordingly, when the retaining ring 40 is installed on the tube 50 and is held captive, the blocking nut 30 may be held captive between the annular projection 22 and the retaining ring 40. Other configurations are considered to hold the blocking nut 30 in an axial position at the interface between the tubular body 20 and the tube 50. For instance, there may be some interference or friction fit between the tubular body 20 and the blocking nut 30, to hold the blocking nut 30 in the selected axial position.

The retaining ring 40 is also known as an axially installed retaining ring, or an external circlip. Therefore, in conventional fashion, the retaining ring 40 has a pair of lugs 41 with holes 42 adjacent to a gap between ends of the retaining ring 40. Pliers may be used to space apart the ends of the retaining ring 40 to elastically deform the retaining ring 40 when positioning same into a groove of the tube 50 as explained hereinafter, or when removing the retaining ring 40. In some instances, the assembly 10 may be without the retaining ring 40. For instance, adhesive, force fits, etc may be used to keep the blocking nut 30 in indexed engagement with the tubular body 20 and the tube 50.

Referring to FIGS. 1-4, the tube 50 is shown having an elongated tubular body 51, through which fluid may flow. A single one of the ends of the elongated tubular body 51 is shown and is a threaded coupling end 52, adapted to be threadingly engaged into the tapping 21 of the tube A. While the coupling end 52 is shown as being threaded, the attachment configuration is selected to be complementary to that of the tube A/tubular body 20. The other unseen end of the elongated tubular body 51 may have any appropriate shape to be connected to a fluid conveying network (e.g., tube, pipe) or to a component.

The tube 50 further comprises an interface 55 adjacent to the threaded connector end 52. The interface 55 may be a hexagonal head with six flats 56, although any number of flats may be suitable, with the number of troughs of inner flats 31 in the nut 30 being a multiple of the number of flats 56. A groove 58 is defined in the interface 55, and is adapted to receive therein the retaining ring 40, in the manner shown in FIG. 1, to hold the blocking nut 30 captive between the annular projection 22 and the retaining ring 40. The threaded connector end 52 and the interface 55 are connected to the elongated tubular body 51, so as to rotate therewith. These components may be integral, or monolithically machined or fabricated.

Figure 6A:
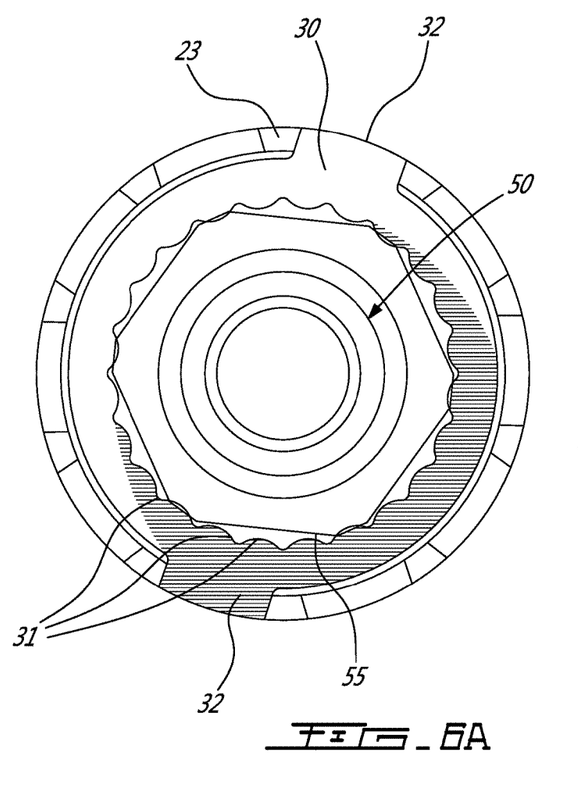
FIG. 6A is a sectional view of the blocking ring of FIG. 3 in an interference situation.
Figure 6B:
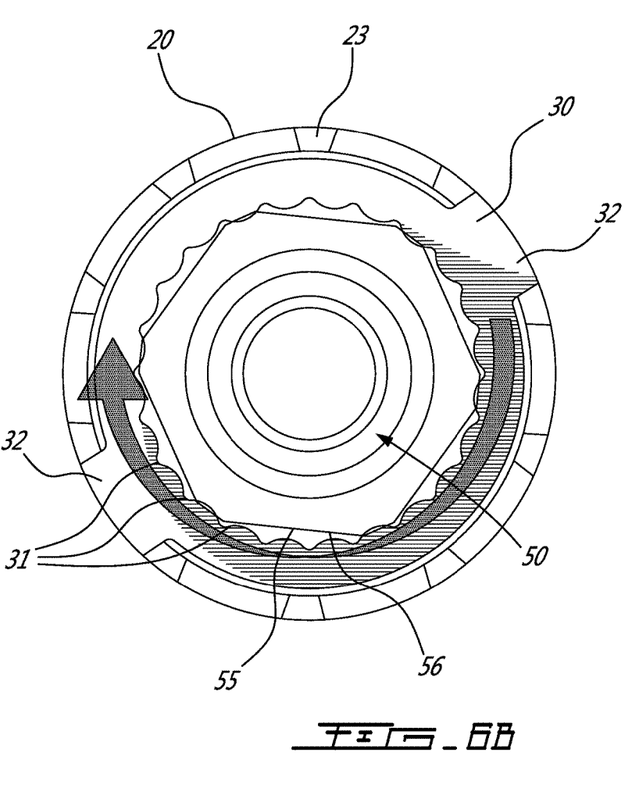
FIG. 6B is a sectional view of the blocking ring of FIG. 3 being oriented to a proper orientation.

As best seen in FIGS. 6A and 6B, the inner flats 31 form surfaces complementary to that of that interface 55, whereby the blocking nut 30 is fixed in rotation to the interface 55 when coupled. In the illustrated embodiment, the troughs-like axial channels formed with the inner flats 31 in the blocking nut 30 are substantially more than the edges formed at the intersection of the flats 56 of the interface 55, while being a multiple thereof. Accordingly, some form of orientation indexing joint is defined therebetween, to select the orientation of the blocking nut 30 on the interface 55 in indexing engagement. By having a relative higher number of complementary surfaces in at least one of the blocking nut 30 and the interface 55, numerous indexing orientations may be possible to adjust an orientation of the interface 55 to the orientation for the blocking nut 30, as the orientation of the blocking nut 30 is dictated by its complementary engagement with the tubular body 20. In the illustrated embodiment, the blocking ring 30 may have twenty-four troughs formed by the inner flats 31, for six edges at the intersection of the flats 56 of the interface 55, although this is provided as an exemplary possibility only. On the other hand, the number of possible orientations of the blocking nut 30 in the tubular body 20 is not a multiple of the number of flats 56 of the interface 55, so as to prevent situations in which the blocking nut 30 cannot find any orientation in which the lugs 32 cannot fit in the depressions in the crenellation pattern 23 for a given torque between tubular body 20 and tube 50.

Now that the various components of the movement-constraining assembly 10 have been described, an installation and functionality thereof will be described. Referring to FIG. 2, the various components are aligned for engagement. Referring to FIG. 3, the tube 50 is connected to the tubular body 20. In the illustrated embodiment, the threaded coupling end 52 is screwed into engagement with the tube A, i.e., with the tapping 21, thereby concurrently forming a conduit for fluids. In the embodiment of FIGS. 1-4, standard tools may be used, as the tubular body 20 and the interface 55 of the tube 50 have standard hexagonal cross-sections. In an embodiment, the tubular body 20 and the tube 50 are tightened to a specified torque.

Referring concurrently to FIGS. 3, 6A and 6B, an orientation of the blocking nut 30 relative to the interface 55 is adjusted, by a rotation of the blocking nut 30 about its axis. More specifically, there may be some interference between the blocking nut 30 and the interface 55 of the tube 50 when the lugs 32 are aligned with depressions in the crenellation pattern 23, as in FIG. 6A. In such a case, the blocking nut 30 is prevented from moving forward into engagement in the tubular body 20. The blocking nut 30 is thus manually rotated until an alignment is found as in FIG. 6B, in which the lugs 32 of the blocking nut 30 may enter depressions in the crenellation pattern 23, and in which the edges of the flats 56 in the tube 50 may enter the troughs between the inner flats 31 of the blocking nut 30. The relative high number of troughs between the inner flats 31 of the blocking nut 30 (i.e., twenty-four troughs), and the multiple relation between the troughs 31 to flats 56 for the non-multiple relation between the depressions in the crenellation pattern 23 (ten depressions) to flats 56 (six) ensures that a high number of alignment combinations to match the specified torque. It is pointed out that the step of manual rotation may be done manually, without any tools, in the environment conditions allow so.

Once a suitable orientation has been reached, the blocking nut 30 may be slid onto the interface 55 in the manner shown concurrently by FIGS. 3 and 4, whereby the nut 30 is blocked from rotating about the tube 50, and the lugs 32 are received in depressions between the crenellations 23. It is observed that the numerous troughs of inner flats 31 and depressions between crenellations 23 ensure that the nut 30 may reach an engagement orientation adjusted to the orientation of the interface 55 relative to that of the tubular body 20.

By way of the cooperation between the lugs 32 of the blocking ring 30 and the depressions between the crenellations in the tubular body 20, and the cooperation between the inner flats 31 of the nut 30 and the interface 55, the blocking nut 30 and thus the tubular body 20 and the tube 50 are prevented from rotating relative to one another about the longitudinal axis of the tube 20.

Figure 8A:
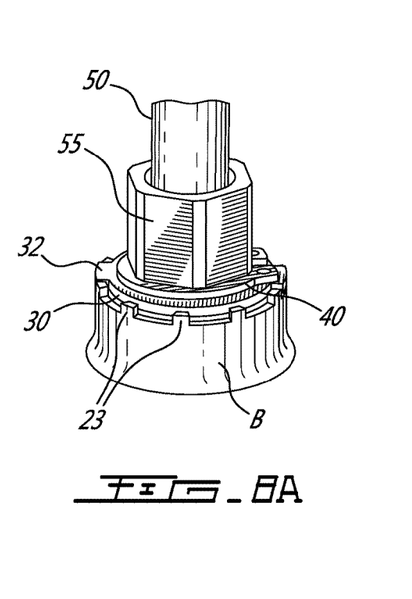
FIG. 8 is an enlarged perspective view of a movement-constraining assembly for fluid-conveying system in accordance with the present disclosure, at a junction between a tube and a conduit of a component.
Figure 8B:
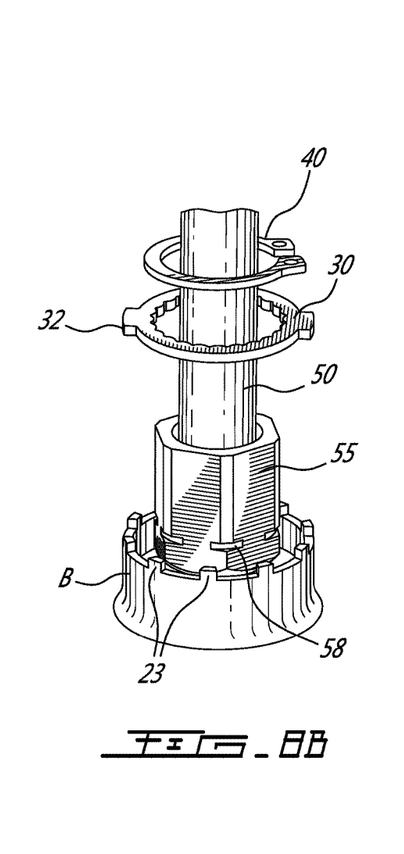
Figure 8C:
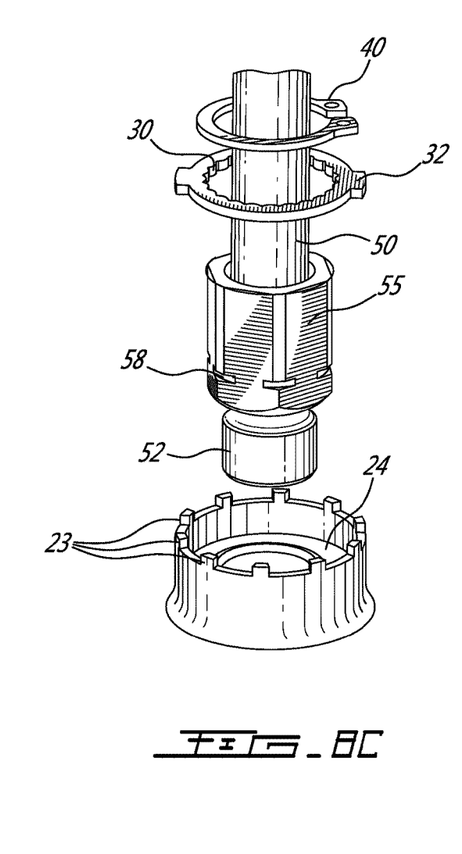

Referring to FIG. 4, the retaining ring 40 may then be installed in the groove 58 so as to hold the blocking nut 30 captive in an axial position, to reach the arrangement of FIG. 1, or that of FIG. 8 if the tubular body 20 is connected to a component. Stated differently, the blocking nut 30 is axially blocked.

If the tubes 20 or 50 must be attended to, the retaining ring 40 may be removed, to then slide the blocking nut 30 away from engagement with the tubular body 20, to undo the joint therebetween.

The above description is meant to be exemplary only, and one skilled in the art will recognize that changes may be made to the embodiments described without departing from the scope of the invention disclosed. For example, some parts of the assembly 10 are described as having a hexagonal section, but this implies quasi-hexagonal sections as well, for instance if edges of a hexagonal head are rounded. Still other modifications which fall within the scope of the present invention will be apparent to those skilled in the art, in light of a review of this disclosure, and such modifications are intended to fall within the appended claims.

The invention claimed is:

1. A movement-constraining assembly for a fluid-conveying system, comprising:
   a tubular body adapted to be secured to a component coupling end of a component of the fluid-conveying system;
   a fluid-conveying tube having a tube coupling end adapted to be connected to the component of the fluid-conveying system and defining an inner passage for fluid to pass therethrough to or from the component, the tube having an interface at the tube coupling end; and
   a blocking nut having an annular body, an inner surface defining at least one first projection protruding radially inwardly from the annular body, the inner surface complementary to at least a surface of the interface of the tube to block rotation between the tube and the blocking nut, the blocking nut further comprising an outer surface defining at least one second projection protruding radially outwardly from the annular body, the outer surface complementary to a surface of the tubular body to block rotation between the blocking nut and the component, the annular body located radially between the fluid-conveying tube and the tubular body relative to a longitudinal axis of the fluid-conveying tube, whereby the blocking nut blocks a rotation between the fluid-conveying tube and the component coupling end.

2. The movement-constraining assembly according to claim 1, wherein the interface of the fluid-conveying tube is integrally formed thereon.

3. The movement-constraining assembly according to claim 2, wherein the interface of the fluid-conveying tube is a body having a hexagonal section or quasi-hexagonal section.

4. The movement-constraining assembly according to claim 1, further comprising a retaining ring, and wherein the fluid-conveying tube has a circumferential groove formed in the interface for receiving the retaining ring, the retaining ring blocking movement of the blocking nut along the fluid-conveying tube to maintain the blocking nut engaged to the interface.

5. The movement-constraining assembly according to claim 4, wherein the retaining ring is an external circlip.

6. The movement-constraining assembly according to claim 1, wherein the complementary surfaces between the tube and the blocking nut form an indexing joint.

7. The movement-constraining assembly according to claim 1, wherein the at least one first projection defined by the inner surface of the blocking nut includes a plurality of first projections, a plurality of axial channels defined between the first projections for complementary engagement of the blocking nut onto the interface of the fluid-conveying tube.

8. The movement-constraining assembly according to claim 7, wherein the interface has edges received in the axial channels, the number of axial channels being a multiple of the number of edges to define indexed orientations between the blocking nut and the interface.

9. The movement-constraining assembly according to claim 8, wherein the number of axial channels is a multiple of at least two of the number of edges.

10. The movement-constraining assembly according to claim 8, wherein the outer surface of the blocking nut and the surface of the tubular body complementarily define a plurality of indexed orientations, with the plurality of indexed orientations between the blocking nut and the tubular body not being a multiple of the number of edges of the interface.

11. The movement-constraining assembly according to claim 1, wherein the tube coupling end of the fluid-conveying tube has threads for screwing engagement with the component of the fluid-conveying system.

12. The movement-constraining assembly according to claim 1, wherein the tubular body has a portion with a hexagonal section or quasi-hexagonal section.

13. The movement-constraining assembly according to claim 1, wherein the at least one second projection defined by the outer surface of the blocking nut comprises at least one lug protruding radially outwardly from the annular body, and the surface of the tubular body comprises a crenellated rim, the at least one lug received in at least one depression in the crenellated rim.

14. The movement-constraining assembly according to claim 1, wherein the blocking nut is a monolithic metal sheet piece.

15. The movement-constraining assembly according to claim 1, wherein the tubular body is integrally part of the component coupling end.

16. The movement-constraining assembly according to claim 1, wherein the inner surface, the at least one first projection, the outer surface, and the at least one second projection all project axially from a common plane normal to the longitudinal axis.

17. A movement-constraining assembly for a fluid-conveying system, comprising:
   a tubular body adapted to be secured to a component coupling end of a component of the fluid-conveying system;
   a fluid-conveying tube having a tube coupling end adapted to be connected to the component of the fluid-conveying system and defining an inner passage for fluid to pass therethrough to or from the component, the tube having an interface at the tube coupling end; and
   a blocking plate having a radially inner surface complementary to at least a surface of the interface of the tube to block rotation between the tube and the blocking plate, the blocking plate further comprising a radially outer surface complementary to a surface of the tubular body to block rotation between the blocking plate and the component, the radially inner surface being axially aligned with the radially outer surface relative to a longitudinal axis of the fluid-conveying tube, whereby the blocking plate blocks a rotation between the fluid-conveying tube and the component coupling end.

18. The movement-constraining assembly of claim 17, further comprising a retaining ring, and wherein the fluid-conveying tube has a circumferential groove formed in the interface for receiving the retaining ring, the retaining ring blocking movement of the blocking plate along the fluid-conveying tube to maintain the blocking plate engaged to the interface.

19. The movement-constraining assembly according to claim 17, wherein the inner surface of the blocking plate has a plurality of axial channels defined therein for complementary engagement of the blocking plate onto the interface of the fluid-conveying tube.

20. The movement-constraining assembly according to claim 17, wherein the outer surface of the blocking plate comprises at least one lug, and the surface of the tubular body comprises a crenellated rim, the at least one lug received in at least one depression in the crenellated rim.

* * * * *